(12) United States Patent
Flowers et al.

(10) Patent No.: US 7,886,356 B2
(45) Date of Patent: Feb. 8, 2011

(54) REMOVING MALICIOUS CODE IN MEDIA

(75) Inventors: James Flowers, Rutherford, NJ (US); Harry Allen Hetz, Silver Spring, MD (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 984 days.

(21) Appl. No.: 11/694,226

(22) Filed: Mar. 30, 2007

(65) Prior Publication Data

US 2008/0238742 A1    Oct. 2, 2008

(51) Int. Cl.
G06F 11/00    (2006.01)
H04L 9/00    (2006.01)

(52) U.S. Cl. .............................. 726/22; 726/24; 726/26
(58) Field of Classification Search ................. 713/160, 713/161, 168–170, 176, 189, 192–194; 726/26–27, 726/30, 22–24
See application file for complete search history.

(56) References Cited

U.S. PATENT DOCUMENTS

| 6,014,427 A | 1/2000 | Hanson |
| 2007/0186093 A1* | 8/2007 | Tighe et al. .................. 713/151 |

* cited by examiner

Primary Examiner—Hosuk Song

(57) ABSTRACT

A method may include receiving untrusted digital media; converting the untrusted digital media into an analog signal; converting the analog signal into trusted digital media; and storing the trusted digital media.

23 Claims, 9 Drawing Sheets

REMOVING MALICIOUS CODE IN MEDIA

BACKGROUND INFORMATION

Viruses, worms, Trojan horses, and other forms of malicious code may propagate through the Internet and other networks. Malicious code may be embedded in media data, such as audio or video data. Such malicious code may cause buffer overruns, for example, resulting in a computer executing arbitrary, and potentially malicious, code. In addition, hidden messages may also be embedded in media data, such as audio or video data.

DETAILED DESCRIPTION OF PREFERRED EMBODIMENTS

The following detailed description refers to the accompanying drawings. The same reference numbers in different drawings may identify the same or similar elements. Also, the following detailed description does not limit the invention.

Figure 1:
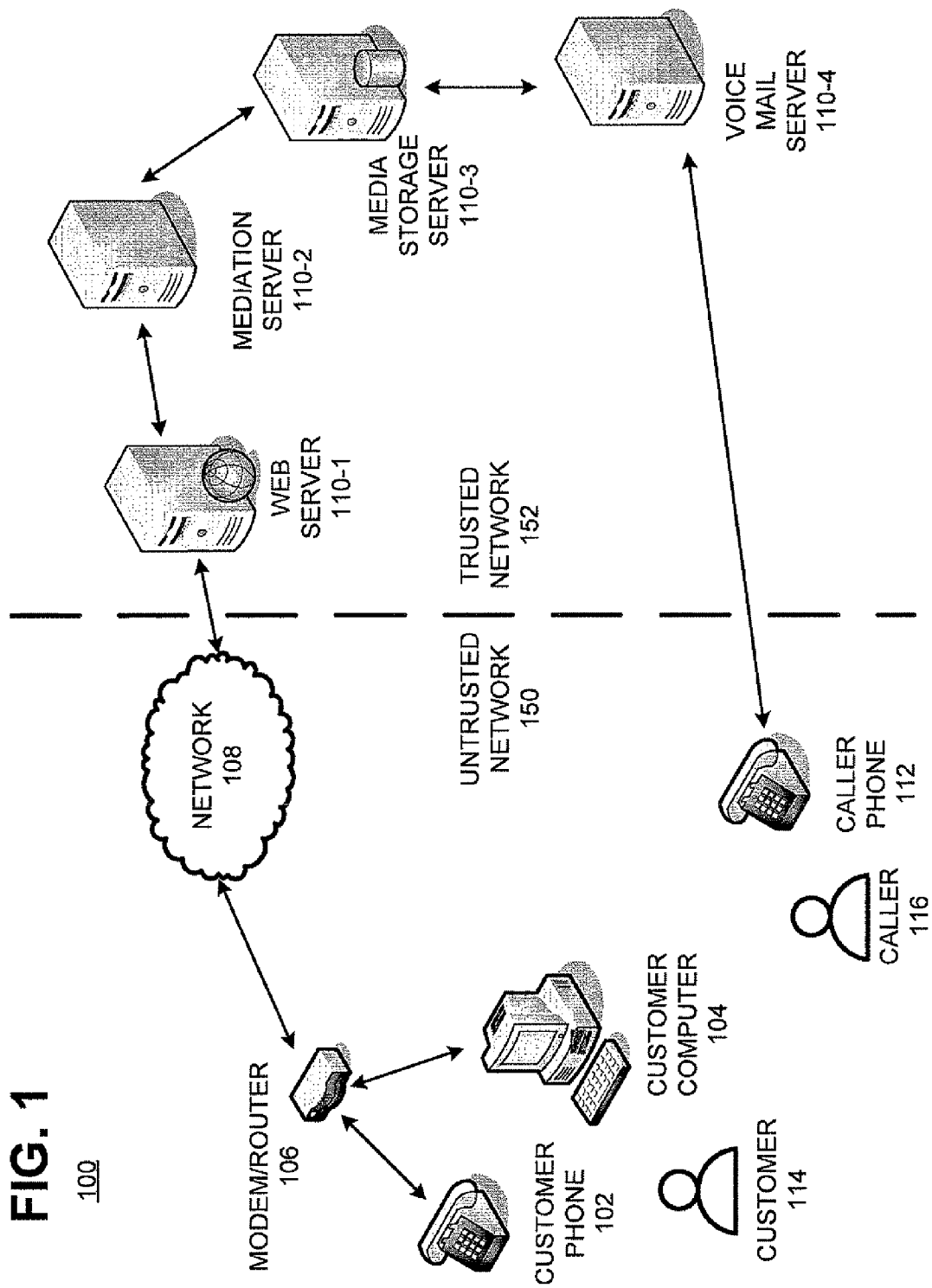
FIG. 1 is a block diagram of an exemplary an environment for receiving untrusted media in a network.

As described herein, a method is provided that may remove malicious code and hidden messages from media such as audio and video. FIG. 1 is a block diagram of an exemplary environment 100 for receiving untrusted media in a network. Environment 100 may include a customer phone 102, a customer computer 104, a modem/router 106, a network(s) 108, a web server 110-1, a mediation server 110-2, a media storage server 110-3, a voice-mail server 110-4, and a caller phone 112. Collectively, servers 110-1 through 110-4 may be referred to as "servers 110." Individually, servers 110-1 through 110-4 may be referred to as "server 110-x." A customer 114 may use customer phone 102 and customer computer 104. A caller 116 may use caller phone 112. In practice, there may be more, different, or fewer devices or a different arrangement of devices than what is shown in FIG. 1. For example, in one embodiment, modem/router 106 may not be present. Further, while FIG. 1 shows devices, such as customer computer 104, phone 102, and modem/router 106, in environment 100, one or more of these devices may be remotely located, e.g., the devices may be geographically diverse.

Environment 100 may be separated into an untrusted network 150 and a trusted network 152. An "untrusted network" is a network in which nefarious traffic, such as malicious code or hidden messages, may originate. A "trusted network" is a network that is known not to originate nefarious traffic, such as malicious code or hidden messages, for example. In embodiments disclosed herein, trusted network 150 may receive media from untrusted network 152. Embodiments disclosed herein may create trusted media from the untrusted media by, for example, decoding and re-encoding the media, converting the media into an analog form and back into a digital form, or by introducing random bits into the media, among other ways.

Untrusted network 150 may include customer phone 102, customer computer 104, modem/router 106, network 108, and caller phone 112. In other words, untrusted network 150 may include customers' equipment (e.g., phone 102, computer 104, and modem/router 106), a caller's equipment (phone 112), and non-private networks (e.g., network 108). Trusted network 152 may include servers 110. In other words, trusted network 152 may include a telephone company's private network.

Customer computer 104, customer phone 102, and modem/router 106 may be located in a telephone company's customer's house. Phone 102 may be a voice-over-Internet ("VoIP") phone that can place calls to other telephones around the world. Customer computer 104 may be a personal computer, personal digital assistant (PDA), cell phone, or laptop. Customer computer 104 and customer phone 102 may be integrated into one device. Modem/router 106 may link customer phone 102 and customer computer 104 to network 108 and to other networks. Network(s) 108 may include one or more sub-networks of any type, including a local area network (LAN), a wide area network (WAN), a satellite network, a metropolitan area network (MAN), a telephone network, such as the Public Switched Telephone Network (PSTN) or a Public Land Mobile Network (PLMN), an intranet, the Internet, or a combination of networks. The PLMN(s) may further include a packet-switched sub-network, such as, for example, General Packet Radio Service (GPRS), Cellular Digital Packet Data (CDPD), or Mobile IP sub-network.

Servers 110 may be located in a telephone company's private network. Servers 110 may provide services to customers, such as a voice-mail service, through network 108. Voice-mail server 110-4 may answer telephone calls when, for example, caller 116 uses phone 112 to call customer phone 102. Voice-mail server 110-4 may not be limited to voice, e.g., audio, but may also be capable of handling outgoing video greetings and incoming video messages.

Media storage server 110-3 may store outgoing voice and/or video greetings and incoming voice and/or video messages. When voice-mail server 110-4 answers a call, it may retrieve outgoing customer greetings from media storage server 110-3 and may play the greeting to caller 116 via phone 112. When caller 116 leaves a message for customer 114, voice-mail server 110-4 may store the incoming message on media storage server 110-3.

Web server 110-1 may allow customer 114 to log into his account and configure settings to services to which customer 114 has subscribed. For example, in a voice-mail service, customer 114 may configure the times that voice-mail server 110-4 should answer phone 102. Web server 110-1 may also allow customer 114 to upload an outgoing audio or video greeting for the voice-mail service for storage in media storage server 110-3. Web server 110-1 may also allow customer 114 to retrieve messages left by caller 116, for example.

Mediation server 110-2 may input media, such as outgoing audio or video greetings, uploaded by customer 114 and may remove malicious code or hidden messages before passing the uploaded media to media storage server 110-3 for storage. Media that may potentially include malicious code or hidden messages may be called "untrusted media." Media known not to include malicious code or hidden messages, or media where malicious code or hidden messages have been removed, may be called "trusted media." Thus, mediation server 110-2 may protect trusted network 152 from malicious code and hidden messages.

Figure 2:
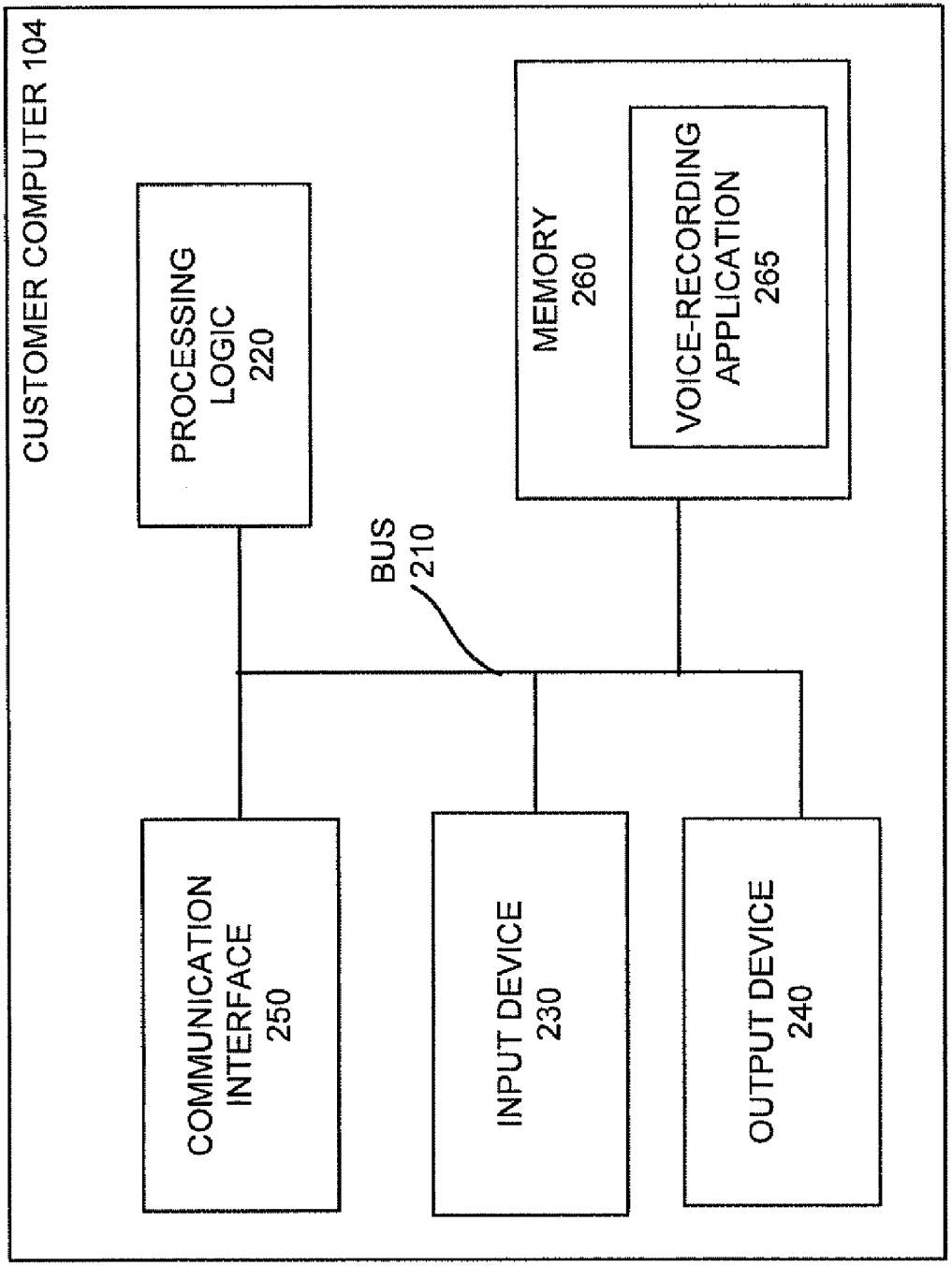
FIG. 2 is a block diagram of exemplary components of a customer's computer.

FIG. 2 is a block diagram of exemplary components of customer computer 104. Customer computer 104 may include a bus 210, processing logic 220, an input device 230, an output device 240, a communication interface 250, and a memory 260. Customer computer 104 may include other components (not shown) that aid in receiving, transmitting, and/or processing data. Moreover, other configurations of components in customer computer 104 are possible. Further, one or more components of customer computer 104 may be remotely located.

Bus 210 may include a path that permits communication among the components of customer computer 104. Processing logic 220 may include any type of processor or microprocessor (or groups of processors or microprocessors) that interprets and executes instructions. In other embodiments, processing logic 220 may include an application-specific integrated circuit ("ASIC"), a field-programmable gate array ("FPGA"), or the like. Processing logic 220 may also include hybrid circuitry that performs both analog and digital functions.

Communication interface 250 may include any transceiver-like mechanism that enables customer computer 104 to communicate with other devices and/or systems. Memory 260 may include a random access memory ("RAM") or another type of dynamic storage device that may store information and instructions for execution by processing logic 220; a read-only memory ("ROM") device or another type of static storage device that may store static information and instructions for use by processing logic 220; and/or some other type of magnetic or optical recording medium and its corresponding drive for storing information and/or instructions. Memory 260 may store a voice-recording application 265, for example. Voice/video-recording application 265 may allow customer computer 104 to record an outgoing greeting for customer 114 to upload to web server 110-1 (for storage in media storage server 110-3) so that voice-mail server 110-4 can play the outgoing greeting to callers, such as caller 116 using caller phone 112. Applications other than a control application 265 are possible, such as a web browser for interacting with web server 110-1.

Input device 250 may include a device that permits a user to input information into customer computer 104, such as a keyboard, a keypad, a mouse, a pen, a microphone, a video camera, one or more biometric mechanisms, or the like. Output device 240 may include a device that outputs information to the user, such as a display, a printer, a speaker, etc.

Customer computer 104 may perform certain operations, as described in detail below. Customer computer 104 may perform these operations in response to processing logic 220 executing software instructions contained in a computer-readable medium, such as memory 260. A computer-readable medium may be defined as a physical or logical memory device and/or carrier wave. The software instructions may be read into memory 260 from another computer-readable medium or from another device via communication interface 250. The software instructions contained in memory 260 may cause processing logic 220 to perform processes that are described below.

Figure 3:
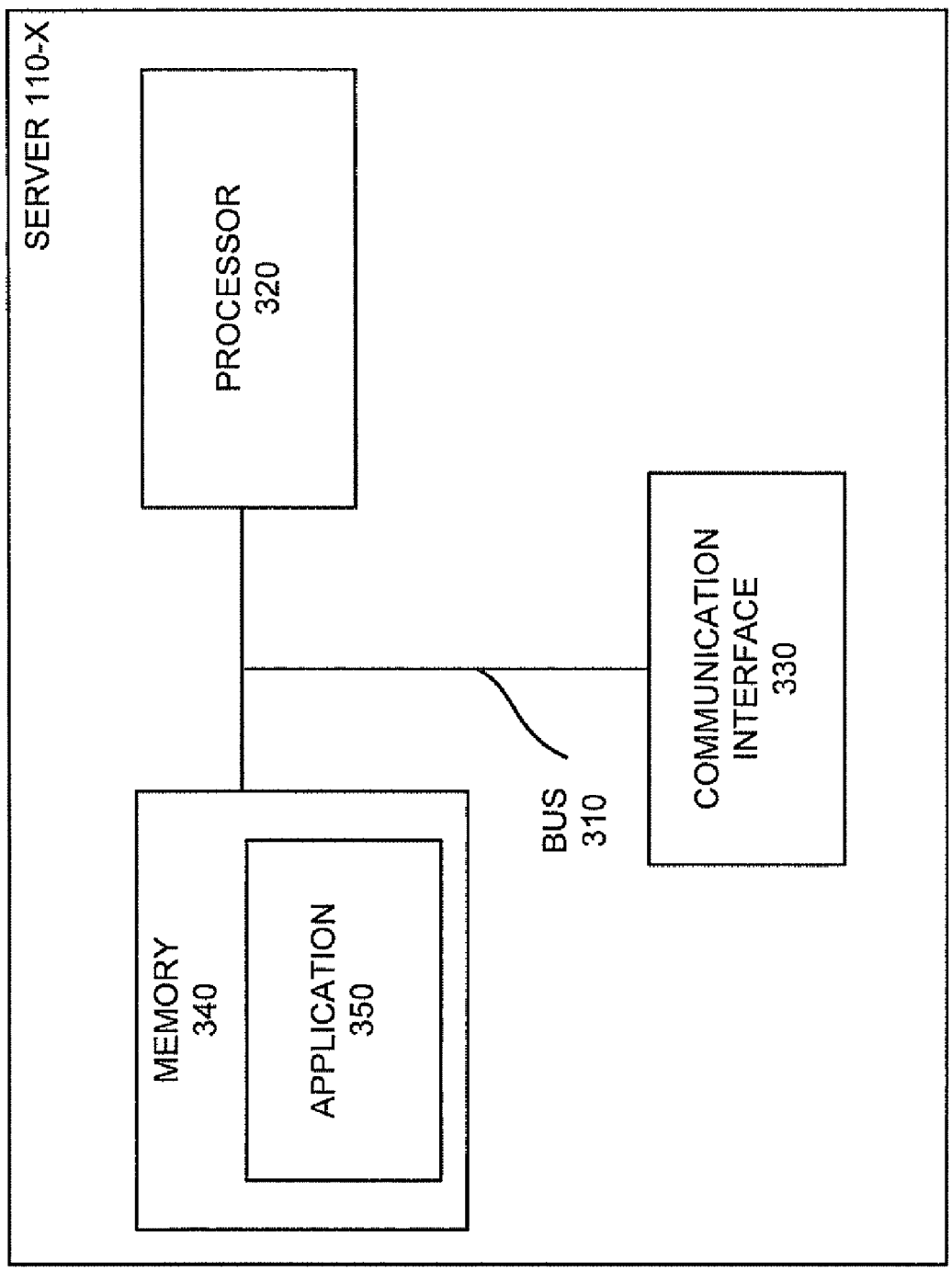
FIG. 3 is a block diagram of exemplary components of a server.

FIG. 3 is a block diagram of exemplary components of server 110-x. Server 110-x may include a bus 310, processor 320, a communication interface 330, and a memory 340. Server 110-x may include other components (not shown) that aid in receiving, transmitting, and/or processing data. Moreover, other configurations of components in server 110-x are possible. For example, one or more components of server 110-x may be remotely located.

Bus 310 may include a path that permits communication among the components of server 110-x. Processor 320 may include any type of processor or microprocessor (or groups of processors or microprocessors) that interprets and executes instructions. In other embodiments, processor 320 may include an ASIC, FPGA, or the like. Processor 320 may include processing logic.

Communication interface 330 may include any transceiver-like mechanism that enables server 110-x to communicate with other devices and/or systems. Memory 340 may include a RAM or another type of dynamic storage device that may store information and instructions for execution by processor 320; a ROM or another type of static storage device that may store static information and instructions for use by processor 320; and/or some other type of magnetic or optical recording medium and its corresponding drive for storing information and/or instructions. Memory 340 may store, for example, an application 350. Application 350 may allow each of servers 110-x to perform functions assigned to it. For example, application 350 in web server 110-1 may include a web server application, such as Apache. Application 350 in media storage server 110-3 may include a database application, such as MySQL. Application 350-4 in voice-mail server 110-4 may include a voice-recognition application for interpreting voice commands. Application 350-2 in mediation server 110-2 may include codec applications. Applications other than those listed above are possible.

Server 110-x may perform certain operations, as described in detail below. Server 110-x may perform these operations in response to processor 320 executing software instructions contained in a computer-readable medium, such as memory 340. The software instructions may be read into memory 340 from another computer-readable medium or from another device via communication interface 330. The software instructions contained in memory 340 may cause processor 320 to perform processes that are described below.

As discussed above, mediation server 110-2 may input untrusted media and may output trusted media. In other words, mediation server 110-2 may remove malicious code and/or hidden messages. This function of removing malicious code and/or hidden messages from media while maintaining the usability of the media may be called "cross-coding," as the term is used herein. Mediation server 110-2 may perform this and other functions using processor 320 in a hardware implementation or in a software implementation, or a combination of both.

Figure 4A:
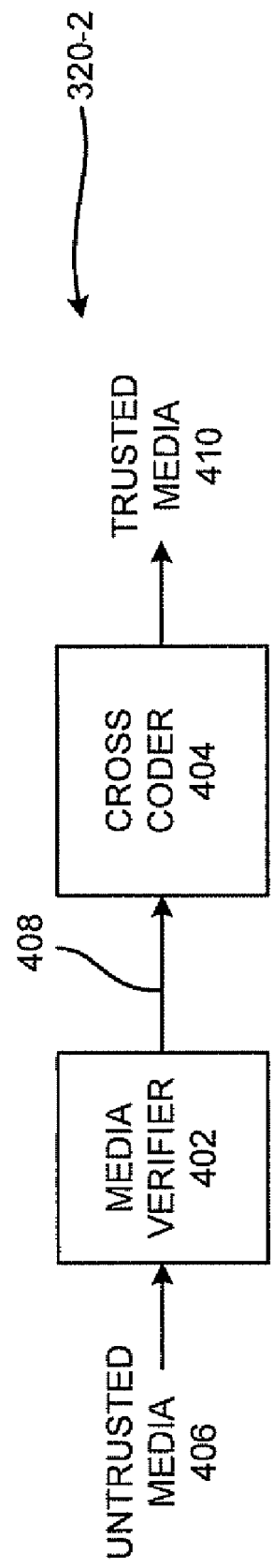
FIGS. 4A, 4B, and 4C are block diagrams of exemplary processors.

FIG. 4A is a functional block diagram that depicts exemplary functions performed by processor 320 of mediation server 110-2. Mediation server 110-2 may functionally include a media verifier 402 and a media cross-coder 404. Media verifier 402 may inspect untrusted media 406 to ensure media 406 is in the correct format and/or that the media is within size limits. Media verifier 402 may also inspect untrusted media 406 for known malicious code or hidden messages. Media cross-coder 402 may input verified media 408 and may output trusted media 410. In one embodiment, cross-coder 404 may remove malicious code and/or hidden messages while maintaining the relative quality of untrusted media 406 in trusted media 410.

Figure 4B:
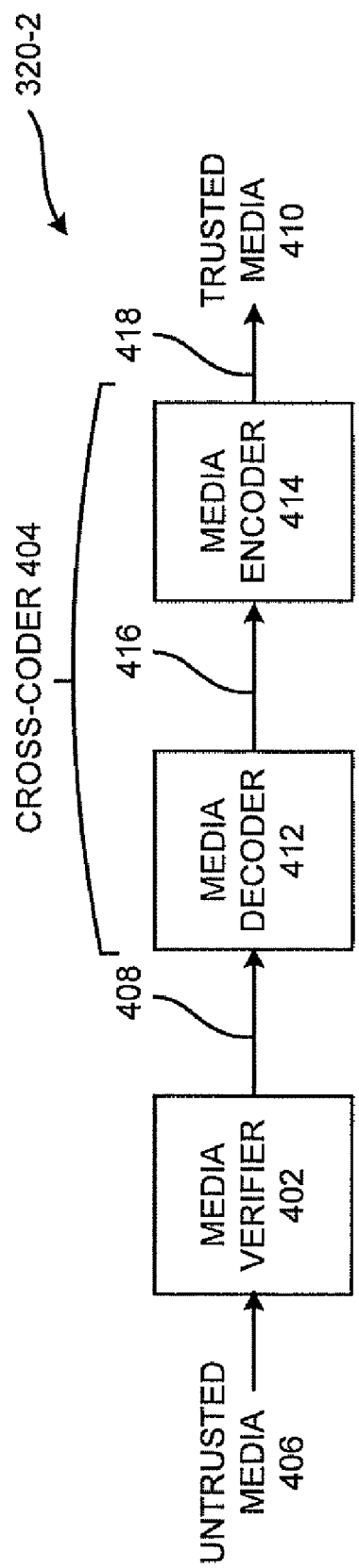

FIG. 4B is a functional block diagram of another embodiment of exemplary functions performed by processor 320 of mediation server 110-2. In this embodiment, mediation server 110-2 may include media verifier 402 and cross coder 404, and cross-coder 402 may further include media decoder 412 and media encoder 414. As in FIG. 4A, media verifier 402 in FIG. 4B may inspect the untrusted media 406 for format, size, and known malicious code and hidden messages. Media decoder 412 may input verified media 408 and may output decoded media 416. Untrusted media 406 and verified media 408 may include a compressed media format, such as MP3, AAC, OGG, WMA, and QFF. Alternatively, untrusted media 406 and verified media 408 may include an uncompressed format such as WAV. Decoded media 416 may include an uncompressed digital format such as WAV. Media encoder 414 may input decoded media 416 and may output re-encoded media 418. Media encoder 414 may implement a different type of codec than media decoder 412. Re-encoded media may form trusted media 410. In another embodiment, decoded media 416 may form trusted media 410 without having to be re-encoded by media encoder 414. In one embodiment, decoding verified media 408 and re-encoding decoded media 412 may help ensure that trusted media 410 is in the correct format, e.g., that it will not create an error when being decoded at a later time in voice-mail server 110-4, for example.

In one embodiment, media decoder 412 and media encoder 414 may be integral such that there is no intermediate decoded media 416. Instead, re-encoded media 418 may be formed directly from verified media 408 during cross coding by cross-coder 404.

In another embodiment, malicious code or hidden messages may be removed by adding random bits to untrusted media 406. For example, media verifier 402, media decoder 412, and/or media encoder 414 may introduce random bits into untrusted media 406, verified media 402, decoded media 416, and/or re-encoded media 418, respectively. Random bits may be added to the least significant bits of untrusted media 406, verified media 408, decoded media 416, or re-encoded media 418. In one embodiment, random bits are not added to strings of zero longer than a given length, such as 100 bits.

For example, a criminal may hide a message in a song by altering the least significant bits of a known song. By altering the least significant bits, the song may imperceptibly change to a person listening to the song. By comparing the altered song to the known song, however, the criminal may extract the hidden message. The criminal may change the least-significant bits, rather than the most-significant bits, because changing the most-significant bits may arouse suspicion because the song would be noticeably garbled to the listener. Likewise, adding random bits may alter malicious code embedded in the media such that the malicious code is no longer disruptive. In one embodiment, adding random bits alone may be sufficient for cross-coding and creating trusted media 410.

Figure 4C:
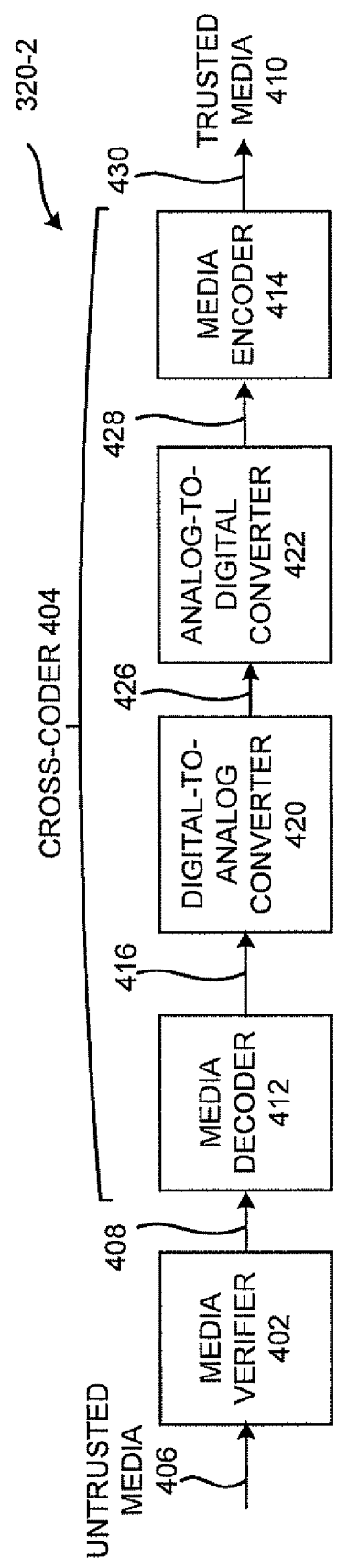

FIG. 4C is a functional block diagram of another embodiment of exemplary functions performed by mediation server 110-2. Mediation server 110-2 may include media verifier 402 and cross-coder 404, and cross-coder 404 may further include media decoder 412, a digital to analog converter 420 ("DAC 420"), an analog-to-digital converter 422 ("ADC 422"), and media encoder 414. Media decoder 412 may input verified media 408 and may output decoded media 416. DAC 420 may input decoded media 416 and may output an analog signal 426. Analog signal 426 may include a voltage that varies with time according to decoded media 416. Alternatively, analog signal 426 may include a current that varies with time according to decoded media 416. Analog signal 426 may include a group of analog signals. For example, analog signal 426 may include a left channel analog signal and a right channel analog signal for stereo audio. Analog signal 426 may include a red, a blue, and a green video component analog signals for video. ADC 422 may input analog signal 426 and may output re-digitized media 428. Re-digitized media 428 may include an uncompressed digital representation of analog signal 426. Media encoder 414 may input re-digitized media 428 and may output re-encoded, re-digitized media 406. Re-encoded, re-digitized media 406 may form trusted media 410. In another embodiment, re-digitized media 428 may form trusted media 410 without being re-encoded by media encoder 414.

Forming analog signal 426 may remove malicious code and hidden messages because malicious code and hidden messages may include digital bits that may not survive a conversion to analog form and then back to digital form. In other words, converting decoded media 412 to analog signal 426 and then to re-digitized signal 428 may have the same effect as randomly changing least-significant bits: the resulting trusted media may not be perceptively different to a human as compared to the untrusted media, but the digital bits in the trusted media may be different than the bits in the untrusted media.

DAC 420 may output an analog signal and ADC 422 may input an analog signal. Therefore, in this embodiment, processor 320 of mediation server 110-2 may include hybrid analog and digital integrated circuitry. In other words, processor 320 of mediation server 110-2 may be an integrated circuit with both analog and digital circuitry. In another embodiment, the digital portion of processor 320 may be separate from the analog circuitry of processor 320, e.g., the digital portion and analog portion may be on different integrated circuits. In another embodiment, the analog portions of processor 320 may be simulated using analog circuit simulation software, such as SPICE ("Simulation Program with Integrated Circuit Emphasis"). In this embodiment, the properties of the transistors, capacitors, etc., of DAC 420 and ADC 422 may be configured using SPICE. In one embodiment, DAC 420 and ADC 422 are configured to permit slight, but imperceptible, degradation of untrusted media 406 to form trusted media 410. In another embodiment, the analog portions of processor 320-2 may be simulated by passing verified media 408 or decoded media 416 through a low-pass, high-pass, or band-pass digital filter.

In a hardware embodiment, media verifier 402, cross-coder 404, media decoder 412, media encoder 414, DAC 420, and ADC 422 may represent hardware logic, e.g., a hardware module. In a software implementation, media verifier 402, cross-coder 404, media decoder 412, media encoder 414, DAC 420, and ADC 422 may represent software functions that may be called by a program.

Figure 5:
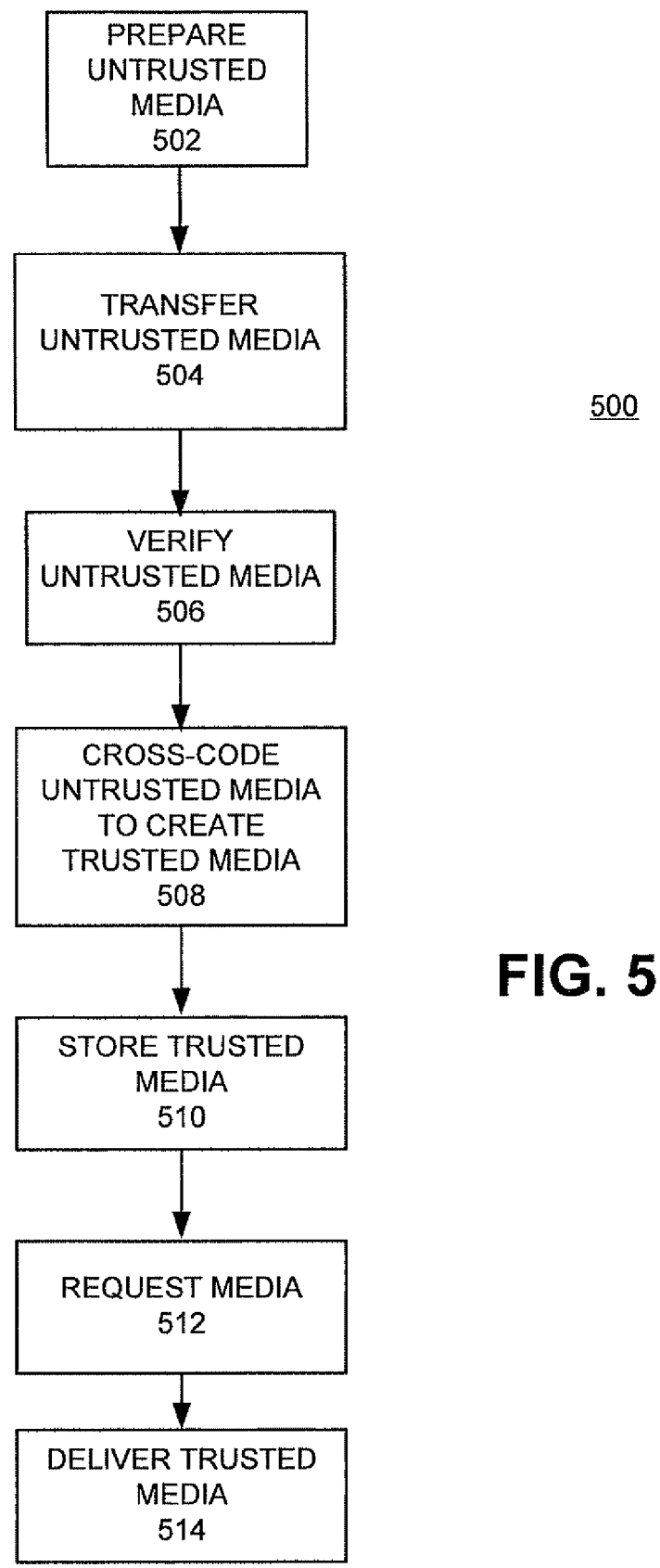
FIG. 5 is a flow chart of an exemplary process for creating trusted media from untrusted media.

FIG. 5 is a flow chart of an exemplary process 500 for creating trusted media 410 from untrusted media 406. Process 500 may begin, for example, when media, including audio, video or both (e.g., a voice or video greeting), may be prepared (block 502). For example, customer 114 may use voice/video-recording application 265 in customer computer 104 to record a voice and video greeting. Customer 114 may also mix a voice greeting with other media, such as a favorite song. Customer 114's voice greeting may form untrusted media 406, as it may include malicious code or a hidden message. Untrusted media 406 may be transferred to a trusted network (block 504). For example, customer 114 may access web server 110-1 and log into his account. Customer 114 may then upload untrusted media 406 to web server 110-1, which may pass untrusted media 406 to mediation server 110-2.

The untrusted media may be verified (block 510). For example, mediation server 110-2 may recognize untrusted media 406 as being untrusted and may inspect it for known malicious code or hidden message, file format, and size. The untrusted media may be cross-coded to create trusted media 410 (block 508). For example, processor 320-2 may cross-code untrusted media 406 to create trusted media 410. Processor 320 of mediation server 110-2 may implement a cross-coder as shown in FIG. 4A, 4B, or 4C, for example. The trusted media may be stored (block 510). For example, trusted media 410 may be transferred to media storage server 110-3. The media may be requested (block 512) from storage. The trusted media may be delivered (block 514). In one embodiment cross-coding (block 508) may take occur after a request for the media (block 512).

Figure 6:
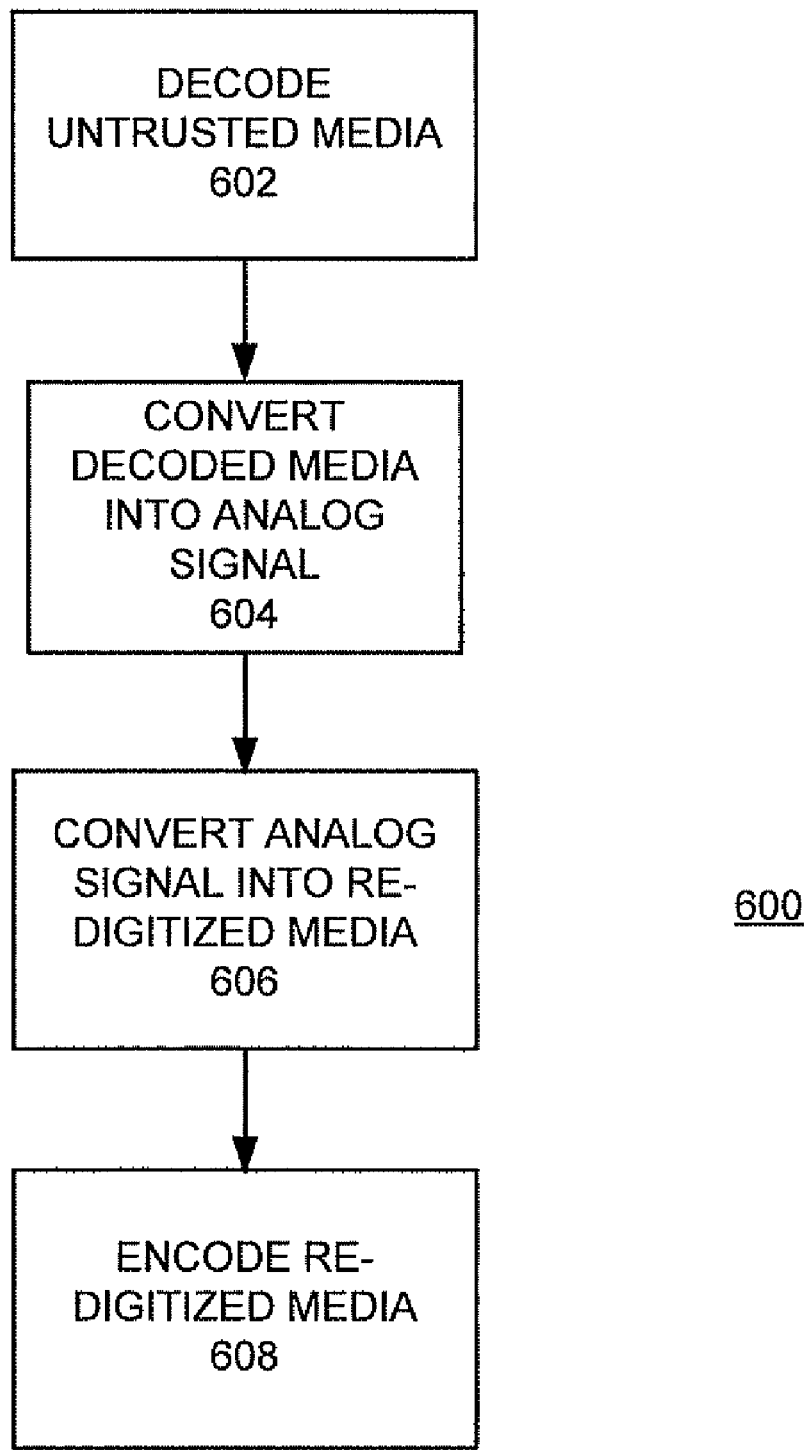
FIGS. 6, 7, and 8 are flow charts of exemplary processes for cross-coding untrusted media to create trusted media.

FIG. 6 is a flow chart illustrating further details of block 508 of FIG. 5 (e.g., cross-coding untrusted 406 media to create trusted media 410) according to another exemplary embodiment. Cross-coding untrusted media 406 may begin, for example, with the decoding of untrusted media 406 (block 602). In one embodiment, the untrusted media may include verified untrusted media. For example, media decoder 412 may input verified media 408 and may output decoded media 416. The decoded media may be converted into an analog signal (block 604). For example, as shown in FIG. 4C, DAC 420 may input decoded media 416 and may output an analog signal 426. The analog signal may be converted into re-digitized digital media (block 606). For example, as shown in FIG. 4C, ADC 422 may input analog signal 426 and may output re-digitized media 428. Re-digitized digital media is encoded to create trusted media (block 608). For example, media encoder 414 may input re-digitized media 428 and may output re-encoded, re-digitized media 430.

Figure 7:
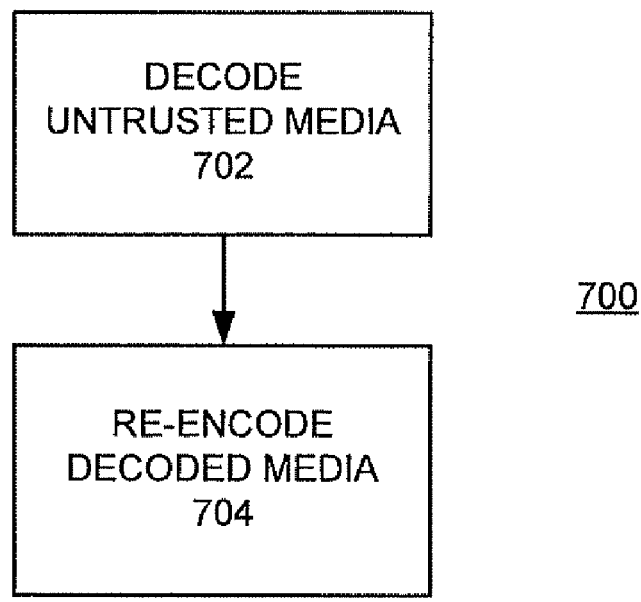

FIG. 7 is a flow chart of another exemplary process 700 for cross-coding untrusted media 406 to create trusted media 410. Untrusted media may be decoded into decoded digital media (block 702). In one embodiment, the untrusted media is verified untrusted media. For example, media decoder 412 may input verified media 408 and may output decoded media 416. Decoded media may be re-encoded (block 704) to create trusted media. For example, as shown in FIG. 4B, media encoder 414 may input decoded media 416 and may output re-encoded media 418.

Figure 8:
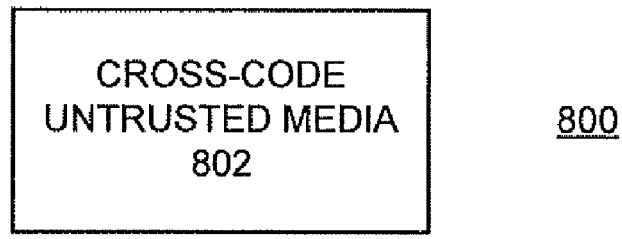

FIG. 8 is a flow chart of another exemplary process 800 for creating trusted media from un-trusted media. Process 600 may begin, for example, when process 500 cross-codes untrusted media (block 508). Untrusted media may be cross-coded into trusted media (block 802). For example, in the embodiment where media decoder 412 and media encoder 414 are integral, there may be no intermediate decoded media 416. In this embodiment, untrusted media 406 may be directly cross-coded into trusted media 410. In addition, random bits may be added to untrusted media 406 to create trusted media 410. For example, random bits may be added to the least significant bits to alter malicious code or hidden messages.

If at any point, processes 500, 600, 700, or 800 determine that untrusted media 406 includes malicious code or a hidden message, the processes may discard untrusted media 406 and return an error to customer 114. In one embodiment, mediation server 110-2 includes a database of known bit strings and known media files that may include malicious code or hidden messages. Media verifier 402 may compare untrusted media 406 to these known bit strings, and may discard untrusted media 506. In one embodiment, if media decoder 412 encounters an error decoding verified media 408, media decoder 412 may discard verified media 408, for example. In another embodiment, if DAC 420 encounters an error converting decoded media 416, DAC 420 may discard decoded media 416, for example. Although FIGS. 4A, 4B, and 4C are described as functional block diagrams (forming part of processor 320-2), they may also be considered structural diagrams with information passing from one structure to the next, for example. Processes 500, 600, 700, and 800, and likewise processor 320-2 shown in FIGS. 4A, 4B, and 4C may operate on media streams or media files.

Embodiments disclosed herein may provide for trusted media being stored in a trusted network. Embodiments disclosed herein may provide for a voice mail service to provide outgoing media that does not include malicious code or hidden messages.

In the preceding specification, various preferred embodiments have been described with reference to the accompanying drawings. It will, however, be evident that various modifications and changes may be made thereto, and additional embodiments may be implemented, without departing from the broader scope of the invention as set forth in the claims that follow. The specification and drawings are accordingly to be regarded in an illustrative rather than restrictive sense.

While series of blocks have been described above, the order of the blocks may differ in other implementations. Moreover, non-dependent acts may be performed in parallel.

It will be apparent that aspects of the embodiments, as described above, may be implemented in many different forms of software, firmware, and hardware in the implementations illustrated in the figures. The actual software code or specialized control hardware used to implement these embodiments is not limiting of the invention. Thus, the operation and behavior of the embodiments of the invention were described without reference to the specific software code—it being understood that software and control hardware may be designed to implement the embodiments based on the description herein.

Further, certain portions of the invention may be implemented as "logic" that performs one or more functions. This logic may include hardware, such as an application specific integrated circuit, a field programmable gate array, a processor, or a microprocessor, software, or a combination of hardware and software.

No element, act, or instruction used in the description of the present application should be construed as critical or essential to the invention unless explicitly described as such. Also, as used herein, the article "a" is intended to include one or more items. Where only one item is intended, the term "one" or similar language is used. Further, the phrase "based on" is intended to mean "based, at least in part, on" unless explicitly stated otherwise.

What is claimed is:

1. A method comprising:
   receiving untrusted digital media in a trusted network device;
   converting the untrusted digital media received in the trusted network device into an analog signal;
   converting the analog signal, converted from the untrusted digital media, into trusted digital media; and
   storing the trusted digital media.

2. The method of claim 1, further comprising:
   decoding the untrusted digital media, wherein converting the untrusted digital media includes converting the decoded untrusted digital media into the analog signal.

3. The method of claim 2, further comprising:
   encoding the trusted digital media, wherein storing the trusted digital media includes storing the encoded trusted digital media.

4. The method of claim 1,
   wherein receiving the untrusted digital media comprises:
   receiving digital media from an untrusted network, and detecting the received digital media as untrusted; and
   wherein storing the trusted digital media comprises storing the trusted digital media in a trusted network.

5. The method of claim 1, wherein the untrusted digital media includes video media.

6. The method of claim 1, wherein converting the untrusted digital media into an analog signal comprises simulating the conversion of the untrusted digital media into an analog signal.

7. A method comprising:
   receiving untrusted digital media in a trusted network from an untrusted network;
   cross-coding the untrusted digital media into trusted digital media, wherein cross-coding includes altering least-significant bits in the untrusted digital media; and
   storing the trusted digital media in a trusted network.

8. The method of claim 7, wherein altering the least-significant bits includes introducing random bits into the untrusted media and wherein cross-coding further comprises:
   decoding the untrusted digital media into decoded digital media; and
   encoding the decoded digital media into the trusted digital media.

9. The method of claim 8, wherein cross-coding further comprises:
   converting the decoded digital media into an analog signal; and
   converting the analog signal into re-digitized digital media, wherein encoding the decoded digital media into the trusted digital media includes encoding the re-digitized digital media into the trusted digital media.

10. The method of claim 9, wherein the untrusted digital media includes video media.

11. The method of claim 7, wherein the untrusted digital media is audio media or video media, the method further comprising removing malicious code from the audio media or the video media while maintaining the usability of the audio media or the video media.

12. The method of claim 10, wherein converting the decoded digital media into an analog signal comprises simulating the conversion of the decoded digital media into an analog signal.

13. A device comprising:
    a transceiver to receive untrusted digital media in a trusted network from an untrusted network;
    a decoder to decode the received untrusted digital media into uncompressed decoded digital media;
    an encoder to receive the uncompressed decoded digital media from the decoder and to encode the uncompressed decoded digital media into trusted digital media; and
    storage to store the trusted digital media in a trusted network.

14. The device of claim 13, further comprising:
    a digital-to-analog converter to convert the uncompressed decoded digital media into an analog signal; and
    an analog-to-digital converter to convert the analog signal into re-digitized digital media,
    wherein the encoder encodes the re-digitized digital media into the trusted digital media.

15. The device of claim 14, wherein the untrusted digital media is or video media.

16. The device of claim 13, wherein the untrusted digital media includes malicious code or a hidden message.

17. The device of claim 13, wherein the transceiver is configured to receive digital media, the device further comprising a processor to determine when the received digital media is trusted media or untrusted media.

18. The device of claim 17, further comprising a simulator to simulate the conversion of the decoded digital media into the analog signal.

19. A method comprising:
    receiving untrusted video media in a trusted network from an untrusted network;
    receiving a request for the received untrusted video media;
    retrieving the received untrusted video media;
    decoding the retrieved untrusted video media to form decoded digital video media;
    encoding the decoded digital video media to form trusted digital video media;
    storing the trusted digital video media in the trusted network device; and
    delivering the trusted digital video media in response to the request for the received untrusted video media.

20. The method of claim 19, further comprising:
    converting the decoded digital video media into an analog signal; and
    converting the analog signal into re-digitized digital video media, wherein encoding the decoded digital video media includes encoding the re-digitized digital video media.

21. The method of claim 20, wherein the analog signal includes component analog video signals.

22. The method of claim 19, wherein the untrusted video media includes malicious code or a hidden message.

23. The method of claim 20, further comprising simulating the conversion of the decoded video media into the analog signal and simulating the conversion of the analog signal into the re-digitized digital video media.

\* \* \* \* \*